US011774419B2

United States Patent
Blankenship et al.

(10) Patent No.: US 11,774,419 B2
(45) Date of Patent: Oct. 3, 2023

(54) CELLULOSE ACETATE TOW WITH LOW DPF AND LOW TITANIUM DIOXIDE CONTENT

(71) Applicant: ACETATE INTERNATIONAL LLC, Irving, TX (US)

(72) Inventors: Susan Blankenship, Irving, WV (US); Dirk Amtower, Pembroke, VA (US); Michael Combs, Pembroke, VA (US); Christopher M. Bundren, Blacksburg, VA (US); Karen Zazzara, Blacksburg, VA (US)

(73) Assignee: ACETATE INTERNATIONAL LLC, Irving, TX (US)

( * ) Notice: Subject to any disclaimer, the term of this patent is extended or adjusted under 35 U.S.C. 154(b) by 585 days.

(21) Appl. No.: 16/855,627

(22) Filed: Apr. 22, 2020

(65) Prior Publication Data

US 2021/0063364 A1 Mar. 4, 2021

Related U.S. Application Data

(60) Provisional application No. 62/892,297, filed on Aug. 27, 2019.

(51) Int. Cl.
| | | |
|---|---|---|
| *G01N 31/00* | (2006.01) | |
| *G01N 31/22* | (2006.01) | |
| *A24D 3/02* | (2006.01) | |
| *A24D 3/10* | (2006.01) | |
| *G01N 1/28* | (2006.01) | |

(52) U.S. Cl.
CPC ........... *G01N 31/22* (2013.01); *A24D 3/0204* (2013.01); *A24D 3/10* (2013.01); *G01N 1/28* (2013.01)

(58) Field of Classification Search
None
See application file for complete search history.

(56) References Cited

U.S. PATENT DOCUMENTS

| | | | | |
|---|---|---|---|---|
| 2,740,775 A | | 4/1956 | Karrer et al. | |
| 3,347,247 A | * | 10/1967 | Lloyd | A24D 3/163 |
| | | | | 131/342 |
| 5,214,137 A | * | 5/1993 | Wilson | C08B 3/24 |
| | | | | 536/78 |

(Continued)

FOREIGN PATENT DOCUMENTS

| | | | | |
|---|---|---|---|---|
| EP | 2740370 B1 | * | 4/2016 | ............... A24D 1/02 |
| EP | 3653765 A1 | | 5/2020 | |

(Continued)

OTHER PUBLICATIONS

International Preliminary Report on Patentability for PCT/US2020/028786 dated Mar. 1, 2022, all pages.

(Continued)

*Primary Examiner* — Stefanie J Cohen
(74) *Attorney, Agent, or Firm* — Kilpatrick Townsend & Stockton LLP

(57) ABSTRACT

Provided herein are cellulose acetate tow bands having less than 0.1 wt. % titanium dioxide, wherein the content of titanium dioxide is measured by ashing and/or by titanium particle count density. Also provided herein is a method of measuring the titanium dioxide content of cellulose acetate tow by ashing. Also provided herein is a method for measuring the color of cellulose acetate tow.

18 Claims, 1 Drawing Sheet

(56) References Cited

U.S. PATENT DOCUMENTS

| | | | |
|---|---|---|---|
| 6,752,945 B2* | 6/2004 | Hernandez | D04H 1/54 |
| | | | 264/235.6 |
| 7,585,441 B2 | 9/2009 | Caenen et al. | |
| 7,610,852 B2 | 11/2009 | Bundren et al. | |
| 2013/0096297 A1 | 4/2013 | Combs et al. | |
| 2013/0115452 A1 | 5/2013 | Bundren et al. | |
| 2014/0026910 A1* | 1/2014 | Bundren | D01F 2/28 |
| | | | 425/381.2 |
| 2015/0128964 A1 | 5/2015 | Bundren et al. | |
| 2015/0164134 A1* | 6/2015 | Taniguchi | A24D 3/10 |
| | | | 106/162.7 |
| 2020/0131670 A1* | 4/2020 | Oguni | D01F 2/28 |

FOREIGN PATENT DOCUMENTS

| | | | | |
|---|---|---|---|---|
| JP | 2019015009 A * | 1/2019 | | D01D 5/04 |
| WO | 93/24685 A1 | 12/1993 | | |
| WO | 2019/012712 A1 | 1/2019 | | |

OTHER PUBLICATIONS

International Search Report and Written Opinion for PCT/US2020/028786 dated Sep. 10, 2020, all pages.

\* cited by examiner

CELLULOSE ACETATE TOW WITH LOW DPF AND LOW TITANIUM DIOXIDE CONTENT

CROSS REFERENCE TO RELATED APPLICATION

The present application claims priority to U.S. Provisional Application No. 62/892,297 filed Aug. 27, 2019, the full disclosure of which is incorporated herein by reference in its entirety.

FIELD

The present disclosure relates generally to cellulose acetate tow with a low titanium dioxide content. In particular, the present disclosure relates to cellulose acetate tow bands having less than 0.1 wt. % titanium dioxide. The present disclosure also relates to processes for preparing and analyzing cellulose acetate tow with a low titanium dioxide content.

BACKGROUND

Cellulose esters such as cellulose acetate are known for their robust uses, especially as filaments and fibers. Indeed, cellulose acetate is one of the principle types of natural based fibers and has many commercial applications. For example, cellulose acetate tow is commonly used in the manufacture of cigarette filters. During the conventional manufacture of the tow, a delusterant, typically titanium dioxide, is incorporated in various processing steps in order to provide a specific opacity to the final cigarette filter. The addition of titanium dioxide during conventional cellulose acetate tow manufacture can also ensure uniformity of appearance in the tow. The titanium dioxide may also be used to accelerate the photodegradation of the cigarette filter, an important consideration for minimizing the littering problem associated with the disposal of spent cigarettes.

Although titanium dioxide is a common additive in cellulose acetate tow, the present inventors have found that the addition of titanium dioxide may have negative or otherwise deleterious effects on the manufacture of cellulose acetate tow as well as on the cellulose acetate tow itself. The titanium dioxide additive is typically purchased separately and so increases the overall cost of the manufacturing the cellulose acetate tow. Removing or omitting titanium dioxide may therefore reduce the cost of manufacture.

By removing or omitting titanium dioxide, wear of manufacturing machinery may also be reduced. The present inventors have found, for example, that the presence of titanium dioxide in the cellulose acetate tow may contribute to wear of the crimper or other machinery.

Broadly, the present inventors have found that the reduction or omission of titanium dioxide improves the quality of the two. Studies have shown, for example, that the presence of titanium dioxide may contribute to yarn breakage during spinning of the cellulose acetate fibers. Yarn or thread breakage during spinning reduces the production efficiency. These studies suggest that yarn breakage can be prevented, and production efficiency thereby improved, by reducing the titanium dioxide content in and/or omitting titanium dioxide during cellulose acetate tow production.

Furthermore, consumers may prefer products that comprise cellulose acetate fibers that are free from titanium dioxide. The present inventors have discovered that consumers tend to perceive the addition of titanium dioxide as an impurity in the product. This may be undesirable for consumers who prefer more "natural" or "organic" products.

Thus, the need exists for cellulose acetate tow having a low titanium dioxide content.

The present inventors have found that attempts to produce cellulose acetate tow with a low titanium dioxide content are nevertheless hindered rise by a number of manufacturing difficulties, including difficulties in ensuring a consistently low titanium dioxide content, difficulties in producing cellulose acetate tow of a certain color, and difficulties in producing cellulose acetate tow of consistent color.

Furthermore, the present inventors have found that the production of cellulose acetate tow with a low titanium dioxide content is infeasible due to inadequate methods for analytical measurement and/or quality control. For example, the present inventors have found that conventional methods of measuring the titanium dioxide content of cellulose acetate tow are unable to accurately measure low concentrations of titanium dioxide. Similarly, conventional methods of measuring the color of cellulose acetate tow are unable to accurately measure the color of cellulose acetate tow that has a low titanium dioxide content.

Thus, the need also exists for new analytical methods that are suitable for cellulose acetate tow having a low titanium dioxide content.

SUMMARY

The present disclosure relates, in some embodiments, to a tow band comprising cellulose acetate fibers; wherein the tow band comprises less than 0.1 wt. % titanium dioxide as measured by ashing and/or titanium particle count density; and wherein tow band has an "L" value from 90 to 100, an "a" value from −1 to −0.5, and/or a "b" value from 3 to 6 as measured from a dope solution. In some aspects, the tow band comprises less than 0.01 wt. % titanium dioxide. In some aspects, the tow band has an ash weight that is less than 0.1% of the tow band. In some aspects, the tow band has less than 1.0 titanium dioxide particles per denier. In some aspects, the tow band has less than 12.5 denier per filament. In some aspects, the tow band has from 5,000 to 100,000 total denier. In some aspects, the cellulose acetate fibers have a cross-sectional shape selected from the group consisting of circular, substantially circular, crenulated, ovular, substantially ovular, polygonal, substantially polygonal, dog-bone, "Y," "X," "K," "C," multi-lobe, and any combination thereof.

The present disclosure also relates, in some embodiments, to a method of measuring a titanium dioxide content of cellulose acetate, the method comprising: preparing a sample of cellulose acetate for measurement; ashing the sample to form an ashed sample; dissolving the ashed sample to form a sample solution; titrating a blank solution with a titanium standard; and comparing the titrated blank solution with the sample solution. In some aspects, the titanium dioxide content of the cellulose acetate is less than 1000 ppm. In some aspects, the titanium dioxide content of the cellulose acetate is 15 ppm or greater. In some aspects, the preparing comprises treating the cellulose acetate with an organic non-solvent selected from the group consisting of isopropyl alcohol, diethyl ether, 2-butanol, methyl-t-butyl ether, ispropyl ether, 2-pentanone, isobutyl acetate, ethylene glycol methyl ether, alcohols, ethers, ketones, esters, or other non-solvents and combinations thereof. In some aspects, the ashing further comprises: burning the sample; and treating with a salt selected from the group consisting of sodium pyrosulfate, sodium sulfate, sodium hydrogen sulfate, potassium pyrosulfate, potassium hydrogen pyrosulfate, potassium sulfate, potassium hydrogen sulfate, and combinations thereof. In some aspects, the dissolving comprises dissolving the ashed sample in water and/or an acid. In some aspects, the method further comprises treating the sample solution with hydrogen peroxide. In some aspects, the blank solution comprises water, sulfuric acid, and hydrogen peroxide. In some aspects, the titanium standard comprises from 0.1 to 50 ppm titanium dioxide.

The present disclosure also relates, in some embodiments, to a method for measuring the color of a dope solution of cellulose acetate, the method comprising: preparing a patty of cellulose acetate from the dope solution; providing a tile; placing the patty and the tile on a reflectance port of a colorimeter such that the tile is behind the patty; and recording the color of the patty using the colorimeter. In some aspects, the preparing comprises pressing the cellulose acetate on a hot plate. In some aspects, the tile is white.

The present disclosure also relates, in some embodiments, to a tow band comprising: cellulose acetate fibers having a denier per filament less than 12.5 and a total denier from 5,000 to 100,000; and wherein the tow band is substantially free of titanium dioxide.

The present disclosure also relates, in some embodiments, to a tow band comprising: cellulose acetate fibers having a denier per filament less than 12.5; wherein the tow band comprises less than 0.1 wt. % titanium dioxide, and wherein the tow band has an average titanium dioxide particle density of less than 1.0 titanium dioxide particles per fiber denier.

BRIEF DESCRIPTION OF THE DRAWINGS

The disclosure is described in detail below with reference to the appended drawings, wherein like numerals designate similar parts.

DETAILED DESCRIPTION

Introduction

Figure 1A:
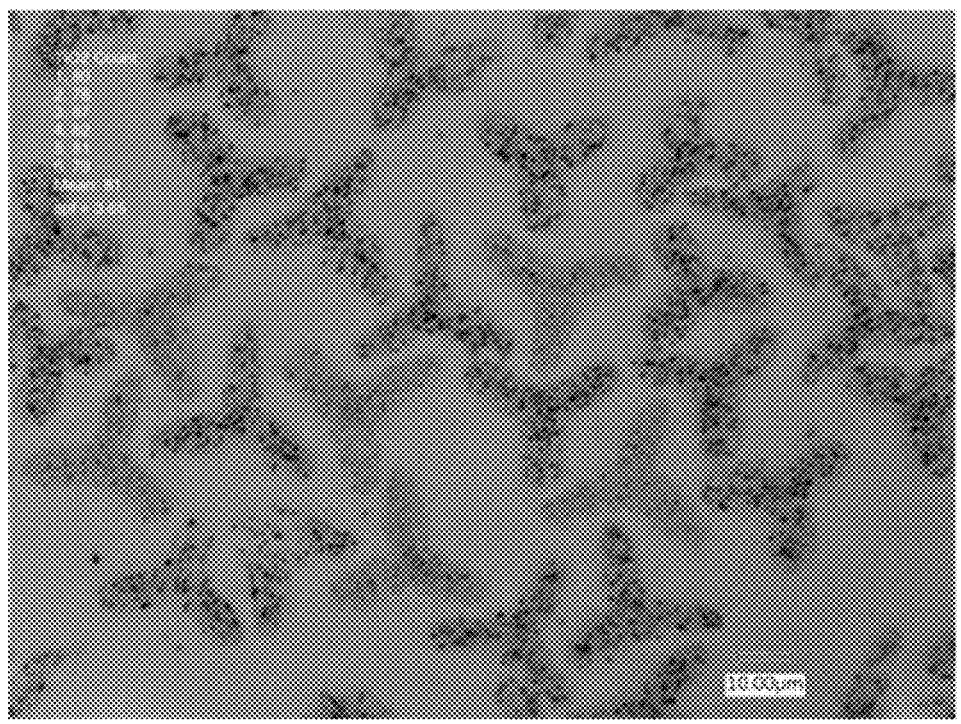
FIG. 1A shows cross-sectional image analysis of conventional cellulose acetate fibers.

The present disclosure is directed to a tow band comprising cellulose acetate fibers, wherein the tow band comprises less than 0.1 wt. % titanium dioxide and wherein the content of titanium dioxide in the tow band is measured by ashing and/or titanium particle count density. The present disclosure is further directed to a method of measuring titanium dioxide content of cellulose acetate tow. The present disclosure is also directed to a method for measuring the color of cellulose acetate tow.

Advantageously, the tow band disclosed herein exhibits improved resistance to yarn breakage while also being more cost efficient in production and satisfy consumer demand for more natural products. Furthermore, the methods disclosed herein advantageously allow for accurate and precise measurement of the titanium dioxide concentration and color of the cellulose acetate tow, respectively. These methods are advantageously suitable for measuring tow bands having low titanium dioxide content, such as those according to embodiments disclosed herein.

Cellulose Acetate

As described herein, the present disclosure relates to a tow band of cellulose acetate fibers, wherein the tow band comprises less than 0.1 wt. % titanium dioxide.

Cellulose acetate may be prepared by known processes, including those disclosed in U.S. Pat. No. 2,740,775 and in U.S. Publication No. 2013/0096297, the entireties of which are incorporated herein by reference. Typically, acetylated cellulose is prepared by reacting cellulose with an acetylating agent in the presence of a suitable acidic catalyst and then de-esterifying.

The cellulose may be sourced from a variety of materials, including cotton linters, a softwood or from a hardwood. Softwood is a generic term typically used in reference to wood from conifers (i.e., needle-bearing trees from the order Pinales). Softwood-producing trees include pine, spruce, cedar, fir, larch, douglas-fir, hemlock, cypress, redwood and yew. Conversely, the term hardwood is typically used in reference to wood from broad-leaved or angiosperm trees. The terms "softwood" and "hardwood" do not necessarily describe the actual hardness of the wood. While, on average, hardwood is of higher density and hardness than softwood, there is considerable variation in actual wood hardness in both groups, and some softwood trees can actually produce wood that is harder than wood from hardwood trees. One feature separating hardwoods from softwoods is the presence of pores, or vessels, in hardwood trees, which are absent in softwood trees. On a microscopic level, softwood contains two types of cells, longitudinal wood fibers (or tracheids) and transverse ray cells. In softwood, water transport within the tree is via the tracheids rather than the pores of hardwoods. In some aspects, a hardwood cellulose is preferred for acetylating.

Acylating agents can include both carboxylic acid anhydrides (or simply anhydrides) and carboxylic acid halides, particularly carboxylic acid chlorides (or simply acid chlorides). Suitable acid chlorides can include, for example, acetyl chloride, propionyl chloride, butyryl chloride, benzoyl chloride and like acid chlorides. Suitable anhydrides can include, for example, acetic anhydride, propionic anhydride, butyric anhydride, benzoic anhydride and like anhydrides. Mixtures of these anhydrides or other acylating agents can also be used in order to introduce differing acyl groups to the cellulose. Mixed anhydrides such as, for example, acetic propionic anhydride, acetic butyric anhydride and the like can also be used for this purpose in some embodiments.

In most cases, the cellulose is exhaustively acetylated with the acetylating agent to produce a derivatized cellulose having a high degree of substitution (DS) value, such as from 2.4 to 3, along with some additional hydroxyl group substitution (e.g., sulfate esters) in some cases. Exhaustively acetylating the cellulose refers to an acetylation reaction that is driven toward completion such that as many hydroxyl groups as possible in cellulose undergo an acetylation reaction.

Suitable acidic catalysts for promoting the acetylation of cellulose often contain sulfuric acid or a mixture of sulfuric acid and at least one other acid. Other acidic catalysts not containing sulfuric acid can similarly be used to promote the acetylation reaction. In the case of sulfuric acid, at least some of the hydroxyl groups in the cellulose can become initially functionalized as sulfate esters during the acetylation reaction. Once exhaustively acetylated, the cellulose is then subjected to a controlled partial de-esterification step, generally in the presence of a de-esterification agent, also referred to as a controlled partial hydrolysis step.

De-esterification, as used herein, refers to a chemical reaction during which one or more of the ester groups of the intermediate cellulosic ester are cleaved from the cellulose acetate and replaced with a hydroxyl group, resulting in a cellulose acetate product having a (second) DS of less than 3. "De-esterifying agent," as used herein, refers to a chemical agent capable of reacting with one or more of the ester groups of the cellulose acetate to form hydroxyl groups on the intermediate cellulosic ester. Suitable de-esterifying agents include low molecular weight alcohols, such as methanol, ethanol, isopropyl alcohol, pentanol, R—OH, wherein R is $C_1$ to $C_{20}$ alkyl group, and mixtures thereof. Water and a mixture of water and methanol may also be used as the de-esterifying agent. Typically, most of these sulfate esters are cleaved during the controlled partial hydrolysis used to reduce the amount of acetyl substitution. The reduced degree of substitution may range from 0.5 to 2.9, e.g., from 1.5 to 2.9 or from 2 to 2.6. The degree of substitution may be selected based on the at least one organic solvent to be used in the binder composition. For example, when acetone is used as the organic solvent, the degree of substitution may range from 2.2 to 2.65.

The number average molecular weight of the cellulose acetate may range from 30,000 amu to 100,000 amu, e.g., from 50,000 amu to 80,000 amu and may have a polydispersity from 1.5 to 2.5, e.g., from 1.75 to 2.25 or from 1.8 to 2.2. All molecular weight recited herein, unless otherwise specified, are number average molecular weights. The molecular weight may be selected based on the desired hardness of the final tow or filter rod. Although greater molecular weight leads to increased hardness, greater molecular weight also increases viscosity. The cellulose acetate may be provided in powder or flake form.

In some aspects, blends of different molecular weight cellulose acetate flake or powder may be used. Accordingly, a blend of high molecular weight cellulose acetate, e.g., a cellulose acetate having a molecular weight above 60,000 amu, may be blended with a low molecular weight cellulose acetate, e.g., a cellulose acetate having a molecular weight below 60,000 amu. The ratio of high molecular weight cellulose acetate to low molecular weight cellulose acetate may vary but may generally range from 1:10 to 10:1; e.g., from 1:5 to 5:1 or from 1:3 to 3:1.

Cellulose Acetate Fibers, Tow, and Tow Bales

There are a number of methods of forming fibers from cellulose esters which may be employed to form the cellulose acetate fibers of the present disclosure. In some embodiments, to form fibers from cellulose ester, a dope is formed by dissolving the cellulose ester in a solvent to form a dope solution. The dope solution is typically a highly viscous solution. The solvent of the dope solution may be selected from the group consisting of water, acetone, methylethyl ketone, methylene chloride, dioxane, dimethyl formamide, methanol, ethanol, glacial acetic acid, supercritical carbon dioxide, any suitable solvent capable of dissolving the aforementioned polymers, and combinations thereof. In some aspects, the solvent is acetone or a combination of acetone and up to 5 wt. % water. Pigments may also be added to the dope. The dope may comprise, for example, from 10 to 40 wt. % cellulose acetate and from 60 to 90 wt. % solvent. Pigments, when added, may be present from 0.1 to 5 wt. %, e.g., from 0.1 to 4 wt. %, from 0.1 to 3 wt. % from 0.1 to 2 wt. %, from 0.5 to 5 wt. %, from 0.5 to 4 wt. %, from 0.5 to 3 wt. %, from 0.5 to 2 wt. %, from 1 to 5 wt. %, from 1 to 4 wt. %, from 1 to 3 wt. % or from 1 to 2 wt. %. The dope is then filtered and deaerated prior to being spun to form fibers. The dope may be spun in a spinner comprising one or more cabinets, each cabinet comprising a spinneret. The spinneret comprises holes that affect the rate at which the solvent evaporates from the fibers.

The pigment added to the dope is not particularly limited, and any conventional pigment may be used. Examples of common, suitable pigments include calcium carbonate, diatomaceous earth, magnesium oxide, zinc oxide, and barium sulfate.

Generally, the production of a bale of tow bands may involve spinning fibers from the dope, forming a tow band from the fibers, crimping the tow band, and baling the crimped tow band. Within said production, optional steps may include, but are not limited to, warming the fibers after spinning, applying a finish or additive to the fibers and/or tow band prior to crimping, and conditioning the crimped tow band. The parameters of at least these steps are important for producing desirable bales.

It should be noted that bales may vary in size and shape as needed for further processing. In some embodiments, bales may have dimensions ranging from 30 inches (76 cm) to 60 inches (152 cm) in height, 46 inches (117 cm) to 56 inches (142 cm) in length, and 35 inches (89 cm) to 45 inches (114 cm) in width. In some embodiments, bales may range in weight from 900 pounds (408 kg) to 2100 pounds (953 kg). In some embodiments, bales may have a density greater than 300 kg/m$^3$ (18.8 lb/ft$^3$).

Fibers

In some embodiments, the tow band has less than 12.5 dpf, e.g., less than 12 dpf, less than 10 dpf, less than 8 dpf, or less than 6 dpf. In these embodiments, the tow band may have greater than 1 dpf, e.g., greater than 2 dpf, greater than 3 dpf, greater than 4 dpf, or greater than 15 dpf. In terms of ranges, the tow band of these embodiments may have from 1 to 12.5 dpf, e.g., from 1 to 12 dpf, from 1 to 10 dpf, from 1 to 8 dpf, from 1 to 6 dpf, from 2 to 12.5 dpf, from 2 to 12 dpf, from 2 to 10 dpf, from 2 to 8 dpf, from 2 to 6 dpf, from 3 to 12.5 dpf, from 3 to 12 dpf, from 3 to 10 dpf, from 3 to 8 dpf, from 3 to 6 dpf, from 4 to 12.5 dpf, from 4 to 12 dpf, from 4 to 10 dpf, from 4 to 8 dpf, or from 4 to 6 dpf.

The fibers for use in the present disclosure may have any suitable cross-sectional shape, including, but not limited to, circular, substantially circular, crenulated, ovular, substantially ovular, polygonal, substantially polygonal, dog-bone, "Y," "X," "K," "C," multi-lobe, and any hybrid thereof. As used herein, the term "multi-lobe" refers to a cross-sectional shape having a point (not necessarily in the center of the cross-section) from which at least two lobes extend (not necessarily evenly spaced or evenly sized).

As noted above, fibers for use in the present disclosure may be produced by any method known to one skilled in the art. As noted, in some embodiments, fibers may be produced by spinning a dope through a spinneret. As used herein, the term "dope" refers to a cellulose acetate solution and/or suspension from which fibers are produced. In some embodiments, a dope may comprise cellulose acetate and solvents. In some embodiments, a dope for use in conjunction with the present disclosure may comprise cellulose acetate, solvents, and additives. In some embodiments, the cellulose acetate may be at a concentration in the dope ranging from 10 to 40 wt. percent (e.g., from 20 to 30 wt. %, from 2.5 to 40 wt. %, from 25 to 30 wt. %), and the solvent may be at a concentration from 60 to 90 wt. % (e.g., 60 to 80 wt. %, 70 to 80 wt. %, 80 to 90 wt. %). In some embodiments, the dope may be heated to a temperature ranging from 40° C. to 100° C. (e.g., from 45° C. to 95° C., from 50° C. to 90° C., from 55° C. to 85° C., from 60° C. to 80° C.).

Suitable solvents may include, but not be limited to, water, acetone, methylethyl ketone, methylene chloride, dioxane, dimethyl formamide, methanol, ethanol, glacial acetic acid, supercritical $CO_2$, any suitable solvent capable of dissolving the aforementioned polymers, or any combination thereof. By way of nonlimiting example, a solvent for cellulose acetate may be an acetone/methanol mixture. In some embodiments, to produce very high dpf values of the present disclosure, increased solvent levels compared with amounts for typical dpf values (e.g., 2 to 8 dpf) may be used. For example in some embodiments, to produce very high dpf tow, solvent amounts may be from 5 to 30 wt. % greater when compared with solvent amounts for typical dpf tow. Additional solvent amounts may, in some cases, present challenges to the processing of the fibers.

Some embodiments of the present disclosure may involve treating fibers to achieve surface functionality on the fibers. In some embodiments, fibers may comprise a surface functionality including, but not limited to, biodegradability sites (e.g., defect sites to increase surface area to enhance biodegradability), chemical handles (e.g., carboxylic acid groups for subsequent functionalization), active particle binding sites (e.g., sulfide sites binding gold particles or chelating groups for binding iron oxide particles), sulfur moieties, or any combination thereof. One skilled in the art should understand the plurality of methods and mechanisms to achieve surface functionalities. Some embodiments may involve dipping, spraying, ionizing, functionalizing, acidizing, hydrolyzing, exposing to a plasma, exposing to an ionized gas, or any combination thereof to achieve surface functionalities. Suitable chemicals to impart a surface functionality may be any chemical or collection of chemicals capable of reacting with cellulose acetate including, but not limited to, acids (e.g., sulfuric acid, nitric acid, acetic acid, hydrofluoric acid, hydrochloric acid, and the like), reducing agents (e.g., $LiAlH_4$, $NaBH_4$, $H_2/Pt$, and the like), Grignard reagents (e.g., $CH_3MgBr$, and the like), trans-esterification reagent, amines (e.g., R—$NH_3$ like $CH_3NH_3$), or any combination thereof. Exposure to plasmas and/or ionized gases may react with the surface, produce defects in the surface, or any combination thereof. Said defects may increase the surface area of the fibers which may yield higher loading and/or higher filtration efficacy in the final filter products.

Some embodiments of the present disclosure may involve applying a finish to the fibers. Suitable finishes may include, but not be limited to, at least one of the following: oils (e.g., mineral oils or liquid petroleum derivatives), water, additives, or any combination thereof. Examples of suitable mineral oils may include, but not be limited to, water white (i.e., clear) mineral oil having a viscosity of 80-95 SUS (Sabolt Universal Seconds) measured at 38° C. (100° F.). Examples of suitable emulsifiers may include, but not be limited to, sorbitan monolaurate, e.g., SPAN® 20 (available from Croda, Wilmington, Del.), poly(ethylene oxide) sorbitan monolaurate, e.g., TWEEN® 20 (available from Croda, Wilmington, Del.). The water may be de-mineralized water, de-ionized water, or otherwise appropriately filtered and treated water. The lubricant or finish may be applied by spraying or wiping. Generally, the lubricant or finish is added to the fiber prior to forming the fibers into tow.

In some embodiments of the present disclosure, finish may be applied as a neat finish or as a finish emulsion in water. As used herein, the term "neat finish" refers to a finish formulation without the addition of excess water. It should be noted that finish formulations may comprise water. In some embodiments, finish may be applied neat followed by applying water separately.

In some embodiments of the present disclosure, a finished emulsion may comprise less than 98% water, less than 95%, less than 92%, or less than 85%. In some embodiments, it may be advantageous in later steps to have fibers having a lower weight percentage of moisture (e.g., 5% to 25% w/w of the tow band), of which water is a contributor. The water content of the finished emulsion may be at least one parameter that may assist in achieving said weight percentage of moisture in the fibers. Therefore, in some embodiments, a finished emulsion may comprise less than 92% water, less than 85% water, or less than 75% water.

Tow

The present disclosure preferably includes forming tow bands from a plurality of fibers. In some embodiments, the tow band is from 10,000 to 100,000 total denier, e.g., from 15,000 to 100,000, from 20,000 to 100,000, from 25,000 to 100,000, from 30,000 to 100,000, from 10,000 to 90,000, from 15,000 to 90,000, from 20,000 to 90,000, from 25,000 to 90,000, from 30,000 to 90,000, from 10,000 to 90,000, from 15,000 to 90,000, from 20,000 to 90,000, from 25,000 to 90,000, from 30,000 to 90,000, from 10,000 to 80,000, from 15,000 to 80,000, from 20,000 to 80,000, from 25,000 to 80,000, from 30,000 to 80,000, from 10,000 to 70,000, from 15,000 to 70,000, from 20,000 to 70,000, from 25,000 to 70,000, from 30,000 to 70,000, from 10,000 to 60,000, from 15,000 to 60,000, from 20,000 to 60,000, from 25,000 to 60,000, or from 30,000 to 60,000. In terms of upper limits, the tow band may be less than 100,000 total denier, e.g., less than 90,000, less than 80,000, less than 70,000, or less than 60,000. In terms of lower limits, the tow band may be greater than 10,000 total denier, e.g., greater than 15,000, greater than 20,000, greater than 25,000, or greater than 30,000.

In some embodiments, the tow can have a breaking strength between 3.5 kg and 25 kg, e.g. from 3.5 kg to 22.5 kg, from 3.5 kg to 20 kg, from 3.5 kg to 17.5 kg, from 3.5 kg to 15 kg, from 4 kg to 25 kg, from 4 kg to 22.5 kg, from 4 kg to 20 kg, from 4 kg to 17.5 kg, from 4 kg to 15 kg, from 4.5 kg to 25 kg, from 4.5 kg to 22.5 kg, from 4.5 kg to 20 kg, from 4.5 kg to 17.5 kg, from 4.5 kg to 15 kg, from 5 kg to 25 kg, from 5 kg to 22.5 kg, from 5 kg to 20 kg, from 5 kg to 17.5 kg, or from 5 kg to 15 kg. In terms of upper limits, the tow may have a breaking strength of less than 25 kg, e.g., less than 22.5 kg, less than 20 kg, less than 17.5 kg, or less than 15 kg. In terms of lower limits, the tow may have a breaking strength of greater than 3.5 kg, e.g. greater than 4 kg, greater than 4.5 kg, or greater than 5 kg.

In some embodiments of the present disclosure, a tow band may comprise more than one type of fiber. In some embodiments, the more than one type of fiber may vary based on dpf, cross-sectional shape, composition, treatment prior to forming the tow band, or any combination thereof. Examples of suitable additional fibers may include, but are not limited to, carbon fibers, activated carbon fibers, natural fibers, synthetic fibers, or any combination thereof.

Some embodiments of the present disclosure may include crimping the tow band to form a crimped tow band. Crimping the tow band may involve using any suitable crimping technique known to those skilled in the art. These techniques may include a variety of apparatuses including, but not limited to, a stuffer box or a gear. Nonlimiting examples of crimping apparatuses and the mechanisms by which they work can be found in U.S. Pat. Nos. 7,610,852 and 7,585,441, the entire contents and disclosures of which are incorporated herein by reference. Suitable stuffer box crimpers may have smooth crimper nip rolls, threaded or grooved crimper nip rolls, textured crimper nip rolls, upper flaps, lower flaps, or any combination thereof.

The configuration of the crimp may play a role in the processability of the final bale. Examples of crimp configurations may include, but not be limited to, lateral, vertical, some degree between lateral and vertical, random, or any combination thereof. As used herein, the term "lateral" when describing crimp orientation refers to crimp or fiber bends in the plane of the tow band. As used herein, the term "vertical" when describing a crimp orientation refers to crimp projecting outside of the plane of the tow band and perpendicular to the plane of the tow band. It should be noted that the terms lateral and vertical refer to general overall crimp orientation and may have deviation from said configuration by +/−30 degrees.

In some embodiments of the present disclosure, a crimped tow band may comprise fibers with a first crimp configuration and fibers with a second crimp configuration.

In some embodiments of the present disclosure, a crimped tow band may comprise fibers with at least a vertical crimp configuration near the edges and fibers with at least a lateral crimp configuration near the center. In some embodiments, a crimped tow band may comprise fibers with a vertical crimp configuration near the edges and fibers with a lateral crimp configuration near the center.

The configuration of the crimp may be important for the processability of the final bale in subsequent processing steps, e.g., a lateral crimp configuration may provide better cohesion of fibers than a vertical crimp configuration unless further steps are taken to enhance cohesion. Methods for crimping tow bands with a substantially later crimp configuration are disclosed, for example, in U.S. Pub. No. 2013/0115452 and U.S. Pub. No. 2015/0128964, each of which is incorporated herein in its entirety.

In some embodiments of the present disclosure, the fibers may be adhered to each other to provide better processability of the final bale. While adhesion additives may be used in conjunction with any crimp configuration, it may be advantageous to use adhesion additives with a vertical crimp configuration. In some embodiments, adhering may involve adhesion additives on and/or in the fibers. Examples of such adhesion additives may include, but not be limited to, binders, adhesives, resins, tackifiers, or any combination thereof. It should be noted that any additive described herein, or otherwise, capable of adhering two fibers together may be used, which may include, but not be limited to, active particles, active compounds, ionic resins, zeolites, nanoparticles, ceramic particles, softening agents, plasticizers, pigments, dyes, flavorants, aromas, controlled release vesicles, surface modification agents, lubricating agents, emulsifiers, vitamins, peroxides, biocides, antifungals, antimicrobials, antistatic agents, flame retardants, antifoaming agents, degradation agents, conductivity modifying agents, stabilizing agents, or any combination thereof. Some embodiments of the present disclosure may involve adding adhesive additives to the fibers (in, on, or both) by incorporating the adhesive additives into the dope, incorporating the adhesive additives into the finish, applying the adhesive additives to the fibers (before, after, and/or during forming the tow band), applying the adhesive additives to the tow band (before, after, and/or during crimping), or any combination thereof.

Adhesive additives may be included in and/or on the fibers at a concentration sufficient to adhere the fibers together at a plurality of contact points to provide better processability of the final bale. The concentration of adhesive additives to use may depend on the type of adhesive additive and the strength of adhesion the adhesive additive provides. In some embodiments, the concentration of adhesive additive may range from a lower limit of 0.01%, 0.05%, 0.1%, or 0.25% to an upper limit of 5%, 2.5%, 1%, or 0.5% by weight of the tow band in the final bale. It should be noted that for additives that are used for more than adhesion, the concentration in the tow band in the final bale may be higher, e.g., 25% or less.

Further, some embodiments of the present disclosure may involve heating the fibers before, after, and/or during crimping. While said heating may be used in conjunction with any crimp configuration, it may be advantageous to use said heating with a vertical crimp configuration. Said heating may involve exposing the fibers of the tow band to steam, aerosolized compounds (e.g., plasticizers), liquids, heated fluids, direct heat sources, indirect heat sources, irradiation sources that causes additives in the fibers (e.g., nanoparticles) to produce heat, or any combination thereof.

Some embodiments of the present disclosure may include conditioning the crimped tow band. Conditioning may be used to achieve a crimped tow band having a residual acetone content of 0.5% or less w/w of the crimped tow band. Conditioning may be used to achieve a crimped tow band having a residual water content of 8% or less w/w of the crimped tow band. Conditioning may involve exposing the fibers of the crimped tow band to steam, aerosolized compounds (e.g., plasticizers), liquids, heated fluids, direct heat sources, indirect heat sources, irradiation sources that causes additives in the fibers (e.g., nanoparticles) to produce heat, or any combination thereof.

UCE is the amount of work required to uncrimp a fiber. UCE, as reported hereinafter, is sampled prior to baling, i.e., post-drying and pre-baling. UCE, as used herein, is measured as follows: using a warmed up (20 minutes before conventional calibration) Instron tensile tester (Model 1130, crosshead gears—Gear #'s R1940-1 and R940-2, Instron Series IX-Version 6 data acquisition & analysis software, Instron 50 Kg maximum capacity load cell, Instron top roller assembly, 1"×4"×⅛" thick high grade Buna-N 70 Shore A durometer rubber grip faces), a preconditioned tow sample (preconditioned for 24 hours at 22° C.±2° C. and Relative humidity at 60%±2%) of about 76 cm in length is looped over and spread evenly across the center of the top roller, pre-tensioned by gently pulling to 100 g=2 g (per readout display), and each end of the sample is clamped (at the highest available pressure, but not exceeding the manufacturers recommendations) in the lower grips to effect a 50 cm gauge length (gauge length measured from top of the robber grips), and then tested, until break, at a crosshead speed of 30 cm/minute. This test is repeated until three acceptable tests are obtained and the average of the three data points from these tests is reported. Energy (E) limits are between 0.220 kg and 10.0 kg. Displacement (D) has a preset point of 10.0 kg. UCE is calculated by the formula: UCE (gcm/cm)=(E*1000)/((D*2)+500). Breaking strength can be calculated using the same test and the following equation BS=L (where L is the load at max load (kg)). In certain embodiments of the disclosure, UCE values (in gcm/cm) can range from 190 to 400, e.g., 200 to 300, e.g., 290. In certain embodiments of the disclosure breaking strength can range from between 3.5 kg and 25 kg, e.g. 4 kg to 20 kg, 4.5 kg to 15 kg, or 5 kg to 12 kg.

Tow Bales

Some embodiments of the present disclosure may include baling the crimped tow band to produce a bale. In some embodiments, baling may involve placing, e.g., laying, depositing, or arranging, the crimped tow band in a can in a pattern. It should be noted that can is used generically to refer to a container that may be in any shape, preferably square or rectangle, and of any material. As used herein, the term "pattern" refers to any design which may or may not change during placing. In some embodiments of the present disclosure, the pattern may be substantially zig-zag having a periodicity of 0.5 cycles/ft to 6 cycles/ft. In some embodiments, placing may involve puddling the crimped tow band with a puddling index of 10 m/m to 40 m/m. As used herein, the term "puddling" refers to allowing the tow band to lay at least partially on itself so as to place a greater actual length of tow band than linear distance on which it is placed. As used herein, the term "puddling index" refers to the length of tow band per linear distance on which it is placed.

In some embodiments of the present disclosure, baling may involve compressing the crimped tow band that has been placed in a suitable container. In some embodiments, baling may involve packaging the compressed crimped tow band. In some embodiments, the packaging may include at least one component like wrapping materials, vacuum ports (for releasing and/or pulling vacuum), securing elements, or any combination thereof. Suitable wrapping materials may include, but not be limited to, air-permeable materials, air-impermeable materials, films (e.g., polymeric films, polyethylene films, plastic wrap), heat-shrinkable films, cardboard, wood, woven materials (i.e., fabric composed of two sets of yarns interlaced with each other to form the fabric), non-woven materials (i.e., assemblies of textile fibers held together by mechanical or chemical means in a random web or mat, e.g., fused thermoplastic fibers), foil materials (e.g., metallic materials), and the like, or any combination thereof. Suitable securing elements may include, but not be limited to, VELCRO®, pins, hooks, straps (e.g., woven, non-woven, fabric, and/or metallic), adhesives, tapes, melt bondings, and the like, or any combination thereof. In some embodiments, at least a portion of the packaging (including any component thereof) may be reusable.

In some embodiments of the present disclosure, fibers may comprise additives. Some embodiments of the present disclosure may involve applying during any step outlined above or between any steps outlined above. Examples of suitable places to incorporate additives may include, but not be limited to, in the dope, in the finish, in the conditioning, or any combination thereof. Further, additives may be applied to the fibers at any point before forming the tow band, to the fibers during and/or after forming the tow band, to the fibers during and/or after crimping the tow band, to the fibers during and/or after conditioning, or any combination thereof.

Suitable additives may include, but not be limited to, active particles, active compounds, ion exchange resins, zeolites, nanoparticles, ceramic particles, softening agents, plasticizers, pigments, dyes, flavorants, aromas, controlled release vesicles, binders, adhesives, tackifiers, surface modification agents, lubricating agents, emulsifiers, vitamins, peroxides, biocides, antifungals, antimicrobials, antistatic agents, flame retardants, antifoaming agents, degradation agents, conductivity modifying agents, stabilizing agents, or any combination thereof. In some embodiments, achieving fibers that comprise an additive may be by including the additives in the dope; by applying the additives to the fibers before, after, and/or during formation of a tow band; by applying the additives to the fibers before, after, and/or during crimping the tow band; by applying the additives to the fibers before, after, and/or during conditioning the crimped tow band; and any combination thereof. It should be noted that applying includes, but is not limited to, dipping, immersing, submerging, soaking, rinsing, washing, painting, coating, showering, drizzling, spraying, placing, dusting, sprinkling, affixing, and any combination thereof. Further, it should be noted that applying includes, but is not limited to, surface treatments, infusion treatments where the additive incorporates at least partially into the fiber, and any combination thereof.

One skilled in the art with the benefit of this disclosure should understand the concentration of the additive will depend at least on the composition of the additive, the size of the additive, the purpose of the additive, the point in the process in which the additive is included, and the size of the fiber. By way of nonlimiting example, additives may be present in the dope in an amount ranging from 0.01% to 10% by weight of the polymer. By way of another nonlimiting example, additives that comprise particulates may be included such that the fiber comprises 0.01% to 10% by volume of the fiber.

Suitable active particles may include, but not be limited to, nano-scaled carbon particles, carbon nanotubes having at least one wall, carbon nanohorns, bamboo-like carbon nanostructures, fullerenes, fullerene aggregates, graphene, few layer graphene, oxidized graphene, iron oxide nanoparticles, nanoparticles, metal nanoparticles, gold nanoparticles, silver nanoparticles, metal oxide nanoparticles, an alumina nanoparticle, a magnetic nanoparticle, paramagnetic nanoparticle, a superparamagnetic nanoparticle, a gadolinium oxide nanoparticle, a hematite nanoparticle, a magnetite nanoparticle, a gado-nanotube, an endofullerene, Gd@C60, a core-shell nanoparticle, an onionated nanoparticle, a nanoshell, an onionated iron oxide nanoparticle, activated carbon, an ion exchange resin, a desiccant, a silicate, a molecular sieve, a silica gel, activated alumina, a zeolite, perlite, sepiolite, Fuller's Earth, magnesium silicate, a metal oxide, iron oxide, activated carbon, and any combination thereof.

Suitable active particles may have at least one dimension of less than one nanometer, such as graphene, to as large as a particle having a diameter of 5000 microns. Active particles may range from a lower size limit in at least one dimension of: 0.1 nanometers, 0.5 nanometers, 1 nanometer, 10 nanometers, 100 nanometers, 500 nanometers, 1 micron, 5 microns, 10 microns, 50 microns, 100 microns, 150 microns, 200 microns, and 250 microns. The active particles may range from an upper size limit in at least one dimension of: 5000 microns, 2000 microns, 1000 microns, 900 microns, 700 microns, 500 microns, 400 microns, 300 microns, 250 microns, 200 microns, 150 microns, 100 microns, 50 microns, 10 microns, and 500 nanometers. Any combination of lower limits and upper limits above may be suitable for use in the present disclosure, wherein the selected maximum size is greater than the selected minimum size. In some embodiments, the active particles may be a mixture of particle sizes ranging from the above lower and upper limits. In some embodiments, the size of the active particles may be polymodal.

Suitable active compounds may include, but not be limited to, malic acid, potassium carbonate, citric acid, tartaric acid, lactic acid, ascorbic acid, polyethyleneimine, cyclodextrin, sodium hydroxide, sulphamic acid, sodium sulphamate, polyvinyl acetate, carboxylated acrylate, and any combination thereof.

Suitable ion exchange resins may include, but not be limited to, polymers with a backbone, such as styrene-divinyl benezene (DVB) copolymer, acrylates, methacrylates, phenol formaldehyde condensates, and epichlorohydrin amine condensates; a plurality of electrically charged functional groups attached to the polymer backbone; and any combination thereof.

Zeolites may include crystalline aluminosilicates having pores, e.g., channels, or cavities of uniform, molecular-sized dimensions. Zeolites may include natural and synthetic materials. Suitable zeolites may include, but not be limited to, zeolite BETA (Na7(Al7Si57O128) tetragonal), zeolite ZSM-5 (Nan(AlnSi96-nO192) 16 H2O, with n<27), zeolite A, zeolite X, zeolite Y, zeolite K-G, zeolite ZK-5, zeolite ZK-4, mesoporous silicates, SBA-15, MCM-41, MCM48 modified by 3-aminopropylsilyl groups, alumino-phosphates, mesoporous aluminosilicates, other related porous materials (e.g., such as mixed oxide gels), or any combination thereof.

Suitable nanoparticles may include, but not be limited to, nano-scaled carbon particles like carbon nanotubes of any number of walls, carbon nanohorns, bamboo-like carbon nanostructures, fullerenes and fullerene aggregates, and graphene including few layer graphene and oxidized graphene; metal nanoparticles like gold and silver; metal oxide nanoparticles like alumina and silica, magnetic, paramagnetic, and superparamagnetic nanoparticles like gadolinium oxide, various crystal structures of iron oxide like hematite and magnetite, 12 nm Fe3O4, gado-nanotubes, and endofullerenes like Gd@C60; and core-shell and onionated nanoparticles like gold and silver nanoshells, onionated iron oxide, and others nanoparticles or microparticles with an outer shell of any of said materials; or any combination of the foregoing (including activated carbon). It should be noted that nanoparticles may include nanorods, nanospheres, nanorices, nanowires, nanostars (like nanotripods and nanotetrapods), hollow nanostructures, hybrid nanostructures that are two or more nanoparticles connected as one, and non-nano particles with nano-coatings or nano-thick walls. It should be further noted that nanoparticles may include the functionalized derivatives of nanoparticles including, but not limited to, nanoparticles that have been functionalized covalently and/or non-covalently, e.g., pi-stacking, physisorption, ionic association, van der Waals association, and the like. Suitable functional groups may include, but not be limited to, moieties comprising amines (1°, 2°, or 3°), amides, carboxylic acids, aldehydes, ketones, ethers, esters, peroxides, silyls, organosilanes, hydrocarbons, aromatic hydrocarbons, and any combination thereof; polymers; chelating agents like ethylenediamine tetraacetate, diethylenetriaminepentaacetic acid, triglycollamic acid, and a structure comprising a pyrrole ring; and any combination thereof. Functional groups may enhance removal of smoke components and/or enhance incorporation of nanoparticles into a porous mass.

Suitable softening agents and/or plasticizers may include, but not be limited to, water, glycerol triacetate (triacetin), triethyl citrate, dimethoxy-ethyl phthalate, dimethyl phthalate, diethyl phthalate, methyl phthalyl ethyl glycolate, o-phenyl phenyl-(bis) phenyl phosphate, 1,4-butanediol diacetate, diacetate, dipropionate ester of triethylene glycol, dibutyrate ester of triethylene glycol, dimethoxyethyl phthalate, triethyl citrate, triacetyl glycerin, and the like, any derivative thereof, and any combination thereof. One skilled in the art with the benefit of this disclosure should understand the concentration of plasticizers to use as an additive to the fibers. By way of non-limiting example, the plasticizer may be added to the dope in an amount sufficient to prevent rupture or bursting of the fiber surface upon sudden thermal discharge of the adsorbed solvent.

As used herein, dyes refer to compounds and/or particles that impart color and are a surface treatment of the fibers. Suitable dyes may include, but not be limited to, CARTASOL® dyes (cationic dyes, available from Clariant Services) in liquid and/or granular form (e.g., CARTASOL® Brilliant Yellow K-6G liquid, CARTASOL® Yellow K-4GL liquid, CARTASOL® Yellow K-GL liquid, CARTASOL® Orange K-3GL liquid, CARTASOL® Scarlet K-2GL liquid, CARTASOL® Red K-3BN liquid, CARTASOL® Blue K-5R liquid, CARTASOL® Blue K-RL liquid, CARTASOL® Turquoise K-RL liquid/granules, CARTASOL® Brown K-BL liquid), FASTUSOL® dyes (an auxochrome, available from BASF) (e.g., Yellow 3GL, Fastusol C Blue 74L).

Suitable flavorants may be any flavorant suitable for use in smoking device filters including those that impart a taste and/or a flavor to the smoke stream. Suitable flavorants may include, but not be limited to, organic material (or naturally flavored particles), carriers for natural flavors, carriers for artificial flavors, and any combination thereof. Organic materials (or naturally flavored particles) include, but are not limited to, tobacco, cloves (e.g., ground cloves and clove flowers), cocoa, and the like. Natural and artificial flavors may include, but are not limited to, menthol, cloves, cherry, chocolate, orange, mint, mango, vanilla, cinnamon, tobacco, and the like. Such flavors may be provided by menthol, anethole (licorice), anisole, limonene (citrus), eugenol (clove), and the like, or any combination thereof. In some embodiments, more than one flavorant may be used including any combination of the flavorants provided herein. These flavorants may be placed in the tobacco column or in a section of a filter. Additionally, in some embodiments, the porous masses of the present disclosure may comprise a flavorant. The amount to include will depend on the desired level of flavor in the smoke taking into account all filter sections, the length of the smoking device, the type of smoking device, the diameter of the smoking device, as well as other factors known to those of skill in the art.

Suitable aromas may include, but not be limited to, methyl formate, methyl acetate, methyl butyrate, ethyl acetate, ethyl butyrate, isoamyl acetate, pentyl butyrate, pentyl pentanoate, octyl acetate, myrcene, geraniol, nerol, citral, citronellal, citronellol, linalool, nerolidol, limonene, camphor, terpineol, alpha-ionone, thujone, benzaldehyde, eugenol, cinnamaldehyde, ethyl maltol, vanilla, anisole, anethole, estragole, thymol, furaneol, methanol, or any combination thereof.

Suitable binders may include, but not be limited to, polyolefins, polyesters, polyamides (or nylons), polyacrylics, polystyrenes, polyvinyls, polytetrafluoroethylene (PTFE), polyether ether ketone (PEEK), any copolymer thereof, any derivative thereof, and any combination thereof. Non-fibrous plasticized cellulose derivatives may also be suitable for use as binder particles in the present disclosure. Examples of suitable polyolefins may include, but not be limited to, polyethylene, polypropylene, polybutylene, polymethylpentene, and the like, any copolymer thereof, any derivative thereof, and any combination thereof. Examples of suitable polyethylenes may include, but not be limited to, ultrahigh molecular weight polyethylene, very high molecular weight polyethylene, high molecular weight polyethylene, low-density polyethylene, linear low-density polyethylene, high-density polyethylene, and the like, any copolymer thereof, any derivative thereof, and any combination thereof. Examples of suitable polyesters may include, but not be limited to, polyethylene terephthalate, polybutylene terephthalate, polycyclohexylene dimethylene terephthalate, polytrimethylene terephthalate, and the like, any copolymer thereof, any derivative thereof, and any combination thereof. Examples of suitable polyacrylics may include, but not be limited to, polymethyl methacrylate, and the like, any copolymer thereof, any derivative thereof, and any combination thereof. Examples of suitable polystyrenes may include, but not be limited to, polystyrene, acrylonitrile-butadiene-styrene, styrene-acrylonitrile, styrene-butadiene, styrene-maleic anhydride, and the like, any copolymer thereof, any derivative thereof, and any combination thereof. Examples of suitable polyvinyls may include, but not be limited to, ethylene vinyl acetate, ethylene vinyl alcohol, polyvinyl chloride, and the like, any copolymer thereof, any derivative thereof, and any combination thereof. Examples of suitable cellulosics may include, but not be limited to, cellulose acetate, cellulose acetate butyrate, plasticized cellulosics, cellulose propionate, ethyl cellulose, and the like, any copolymer thereof, any derivative thereof, and any combination thereof. In some embodiments, binder particles may comprise any copolymer, any derivative, or any combination of the above listed binders. Further, binder particles may be impregnated with and/or coated with any combination of additives disclosed herein.

Suitable tackifiers may include, but not be limited to, methylcellulose, ethylcellulose, hydroxyethylcellulose, carboxy methylcellulose, carboxy ethylcellulose, water soluble cellulose acetate, amides, diamines, polyesters, polycarbonates, silyl-modified polyamide compounds, polycarbamates, urethanes, natural resins, shellacs, acrylic acid polymers, 2-ethylhexylacrylate, acrylic acid ester polymers, acrylic acid derivative polymers, acrylic acid homopolymers, anacrylic acid ester homopolymers, poly(methyl acrylate), poly(butyl acrylate), poly(2-ethylhexyl acrylate), acrylic acid ester co-polymers, methacrylic acid derivative polymers, methacrylic acid homopolymers, methacrylic acid ester homopolymers, poly(methyl methacrylate), poly(butyl methacrylate), poly(2-ethylhexyl methacrylate), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate co-polymers, benzyl coco di-(hydroxyethyl) quaternary amines, p-T-amyl-phenols condensed with formaldehyde, dialkyl amino alkyl (meth)acrylates, acrylamides, N-(dialkyl amino alkyl) acrylamide, methacrylamides, hydroxy alkyl (meth)acrylates, methacrylic acids, acrylic acids, hydroxyethyl acrylates, and the like, any derivative thereof, or any combination thereof.

Suitable lubricating agents may include, but not be limited to, ethoxylated fatty acids (e.g., the reaction product of ethylene oxide with pelargonic acid to form poly(ethylene glycol) ("PEG") monopelargonate; the reaction product of ethylene oxide with coconut fatty acids to form PEG monolaurate), and the like, or any combination thereof. The lubricant agents may also be selected from non-water soluble materials such as synthetic hydrocarbon oils, alkyl esters (e.g., tridecyl stearate which is the reaction product of tridecyl alcohol and stearic acid), polyol esters (e.g., trimethylol propane tripelargonate and pentaerythritol tetrapelargonate), and the like, or any combination thereof.

Suitable emulsifiers may include, but not be limited to, sorbitan monolaurate, e.g., SPAN® 20 (available from Croda, Wilmington, Del.), poly(ethylene oxide) sorbitan monolaurate, e.g., TWEEN® 20 (available from Croda, Wilmington, Del.).

Suitable vitamins may include, but not be limited to, vitamin A, vitamin B1, vitamin B2, vitamin C, vitamin D, vitamin E, or any combination thereof.

Suitable antimicrobials may include, but not be limited to, anti-microbial metal ions, chlorhexidine, chlorhexidine salt, triclosan, polymoxin, tetracycline, amino glycoside (e.g., gentamicin), rifampicin, bacitracin, erythromycin, neomycin, chloramphenicol, miconazole, quinolone, penicillin, nonoxynol 9, fusidic acid, cephalosporin, mupirocin, metronidazolea secropin, protegrin, bacteriolcin, defensin, nitrofurazone, mafenide, acyclovir, vanocmycin, clindamycin, lincomycin, sulfonamide, norfloxacin, pefloxacin, nalidizic acid, oxalic acid, enoxacin acid, ciprofloxacin, polyhexamethylene biguanide (PHMB), PHMB derivatives (e.g., biodegradable biguanides like polyethylene hexamethylene biguanide (PEHMB)), clilorhexidine gluconate, chlorohexidine hydrochloride, ethylenediaminetetraacetic acid (EDTA), EDTA derivatives (e.g., disodium EDTA or tetrasodium EDTA), and the like, and any combination thereof.

Antistatic agents may comprise any suitable anionic, cationic, amphoteric or nonionic antistatic agent. Anionic antistatic agents may generally include, but not be limited to, alkali sulfates, alkali phosphates, phosphate esters of alcohols, phosphate esters of ethoxylated alcohols, or any combination thereof. Examples may include, but not be limited to, alkali neutralized phosphate ester (e.g., TRYFAC® 5559 or TRYFRAC® 5576, available from Henkel Corporation, Mauldin, S.C.). Cationic antistatic agents may generally include, but not be limited to, quaternary ammonium salts and imidazolines which possess a positive charge. Examples of nonionics include the poly(oxyalkylene) derivatives, e.g., ethoxylated fatty acids like EMEREST® 2650 (an ethoxylated fatty acid, available from Henkel Corporation, Mauldin, S.C.), ethoxylated fatty alcohols like TRYCOL® 5964 (an ethoxylated lauryl alcohol, available from Henkel Corporation, Mauldin, S.C.), ethoxylated fatty amines like TRYMEEN® 6606 (an ethoxylated tallow amine, available from Henkel Corporation, Mauldin, S.C.), alkanolamides like EMID® 6545 (an oleic diethanolamine, available from Henkel Corporation, Mauldin, S.C.), or any combination thereof. Anionic and cationic materials tend to be more effective antistats.

As used herein, pigments refer to compounds and/or particles that impart color and are incorporated throughout the fibers. Suitable pigments may include, but not be limited to, silicon dioxide, tartrazine, E102, phthalocyanine blue, phthalocyanine green, quinacridones, perylene tetracarboxylic acid di-imides, dioxazines, perinones disazo pigments, anthraquinone pigments, carbon black, metal powders, iron oxide, ultramarine, calcium carbonate, kaolin clay, aluminum hydroxide, barium sulfate, zinc oxide, aluminumoxide, or any combination thereof.

Titanium dioxide is a commonly used pigment in conventional cellulose acetate tow bands. Conventional cellulose acetate tow bands may comprise titanium dioxide in an amount greater than 0.1 wt. %, e.g., greater than 0.3 wt. %., greater than 0.5 wt. %, greater than 1 wt. %, or greater than 2 wt. %, or As noted above, however, the use of titanium dioxide may give rise to negative side effects, including manufacturing and commercial concerns. Thus, cellulose acetate tow bands according to the present disclosure preferably do not include titanium dioxide as an additive. In some embodiments, the tow band comprises less than 0.1 wt. % (1000 ppm) titanium dioxide, e.g., less than 0.01 wt. % (100 ppm), less than 90 ppm, less than 50 ppm, or less than 25 ppm. In terms of lower limits, the tow band may comprise greater than 0 ppm titanium dioxide, e.g., greater than 1 ppm, greater than 5 ppm, greater than 10 ppm, or greater than 15 ppm. In terms of ranges, the tow band may comprise from 0 ppm to 0.1 wt. % titanium dioxide, e.g., from 0 ppm to 100 ppm, from 0 ppm to 90 ppm, from 0 ppm to 50 ppm, from 0 ppm to 25 ppm, from 1 ppm to 0.1 wt. %, from 1 ppm to 100 ppm, from 1 ppm to 90 ppm, from 1 ppm to 50 ppm, from 1 ppm to 25 ppm, from 5 ppm to 0.1 wt. %, from 5 ppm to 100 ppm, from 5 ppm to 90 ppm, from 5 ppm to 50 ppm, from 5 ppm to 25 ppm, from 10 ppm to 0.1 wt. %, from 10 ppm to 100 ppm, from 10 ppm to 90 ppm, from 10 ppm to 50 ppm, from 10 ppm to 25 ppm, from 15 ppm to 0.1 wt. %, from 15 ppm to 100 ppm, from 15 ppm to 90 ppm, from 15 ppm to 50 ppm, or from 15 ppm to 25 ppm. In some preferred embodiment, the tow band is substantially free of titanium dioxide. In some aspects, titanium dioxide is not purposefully added to the tow band. Any amounts of titanium dioxide detected by the methods disclosed herein are incidental, meaning that they were impurities in other components of the tow band.

Conventional methods of measuring the concentration of titanium dioxide in cellulose acetate tow bands are unable to accurately and/or precisely measure such low concentrations of titanium dioxide. The present inventors have nevertheless developed methods for determining the titanium dioxide content of a cellulose tow band, even when the titanium dioxide is present in an amount of less than 0.1 wt. %.

One approach to determining the titanium dioxide content is by ashing a sample of the cellulose acetate tow. The present inventors have discovered that the cellulose acetate tow disclosed herein has a markedly low ash weight. In some embodiments, the ash weight of the cellulose acetate tow is less than 0.1% of the tow, e.g., less than 0.09%, less than 0.08%, less than 0.07%, less than 0.06%, or less than 0.05%.

Furthermore, the present inventors have discovered that the cellulose acetate tow disclosed herein has a markedly low ash weight relative to that of a conventional cellulose acetate tow band comprising conventional amounts of titanium dioxide (e.g. cellulose acetate tow bands comprising greater than 0.1 wt. % titanium dioxide, greater than 1 wt. %., greater than 2 wt. %, greater than 3 wt. %, greater than 4 wt. %, or greater than 5 wt. %). Conventional cellulose acetate may have an ash weight that is greater than 0.1% of the tow, e.g., greater than 0.2%, greater than 0.3%, or greater than 0.4%. In some embodiments, the cellulose acetate tow bands disclosed herein have an ash weight that is less than 25% of the ash weight of conventional cellulose acetate fibers, e.g., less than 20%, less than 15%, or less than 10%. This difference in ash weight provides a qualitative metric for determining the titanium dioxide content in the cellulose acetate tow band.

The present inventors have also developed another method for quantitatively determining the concentration of titanium dioxide in a tow band by ashing. Embodiments of this method are described in further detail below.

Another approach to determining the titanium dioxide content is by observing the titanium particle count density by, for example, cross-section image analysis. Because individual particles of titanium dioxide are visible within individual fibers of the cellulose acetate tow, an average number of titanium particles per individual fiber denier can be determined. Conventional acetate tow bands typically have from 15 to 50 titanium dioxide particles per fiber denier. In some embodiments, the cellulose acetate tow bands disclosed herein have less than 10.0 titanium dioxide particles per fiber denier, e.g., less than 8.0, less than 5.0, less than 2.0, or less than 1.0.

Figure 1B:
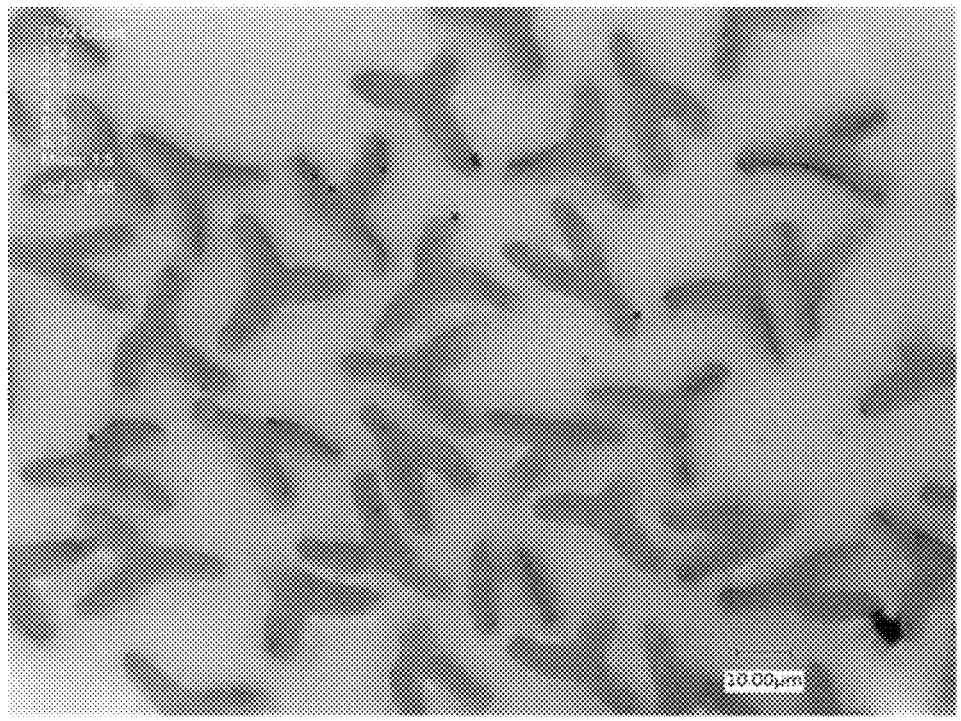
FIG. 1B shows cross-sectional image analysis of cellulose acetate fibers according to embodiments of the present disclosure.

Cross-sectional image analysis of conventional cellulose acetate fibers and cellulose acetate fibers according to the present disclosure are illustrated in FIGS. 1A and 1B, respectively.

Measuring Titanium Dioxide Content of Cellulose Acetate

As noted above, previous efforts to produce cellulose acetate tow with a reduced titanium dioxide content, e.g., cellulose acetate tow that is substantially free of titanium dioxide, have been limited due to the inadequacy of conventional methods for analytical measurement and/or quality control. In particular, the present inventors have found that it had been difficult to produce cellulose acetate tow with a low titanium dioxide content of satisfactory quality, because certain conventional analytical methods could not be utilized for such tow. One example of an analytical method that limited the development of the cellulose acetate tow described herein is a method for measuring the titanium dioxide content of the cellulose acetate tow.

The present inventors have found that conventional methods of measuring the titanium dioxide content of cellulose acetate tow (e.g., by X-ray diffraction technology) are only effective for measuring relatively a high concentrations of titanium dioxide in the tow, e.g., greater than 0.1 wt. % titanium dioxide, greater than 1 wt. %., greater than 2 wt. %, greater than 3 wt. %, greater than 4 wt. %, or greater than 5 wt. %. Conventional methods cannot, however, adequately measure low concentrations of titanium dioxide. Accurate measurements of titanium dioxide content are necessary, e.g., for quality control purposes. An accurate measure of the titanium dioxide content may also be necessary to meet product additive requirements and potential regulations. These requirements may impose a maximum titanium dioxide content in cellulose acetate tow, and so it is necessary to accurately and precisely determine the content of titanium dioxide, particularly at low concentrations of titanium dioxide.

As noted above, the present disclosure relates to a novel method for measuring the titanium dioxide content of cellulose acetate that is suitable for measuring low concentrations of titanium dioxide. This novel method comprises preparing a sample of cellulose acetate for measurement; ashing the sample to form an ashed sample; dissolving the ashed sample to form a sample solution; titrating a blank solution with a titanium standard; and comparing the titrated blank solution with the sample solution.

The method for measuring the titanium dioxide content of cellulose acetate disclosed herein is suitable for cellulose acetate samples having relatively low titanium dioxide contents. In some embodiments, the method is suitable for cellulose acetate samples having a titanium dioxide of less than 0.1 wt. % (1000 ppm), e.g., less than 900 ppm, less than 750 ppm, less than 500 ppm, less than 250 ppm, or less than 100 ppm. In terms of lower limits, the method may be suitable for cellulose acetate samples having a titanium dioxide content of 15 ppm or greater, e.g., greater than 20 ppm, greater than 25 ppm, or greater than 30 ppm. In terms of ranges, the method may be suitable for cellulose acetate samples having a titanium dioxide content of from 15 ppm to 1000 ppm, e.g., from 15 ppm to 900 ppm, from 15 ppm to 750 ppm, from 15 ppm to 500 ppm, from 15 ppm to 250 ppm, from 15 ppm to 100 ppm, from 20 ppm to 1000 ppm, from 20 ppm to 900 ppm, from 20 ppm to 750 ppm, from 20 ppm to 500 ppm, from 20 ppm to 250 ppm, from 20 ppm to 100 ppm, from 25 ppm to 1000 ppm, e.g., from 25 ppm to 900 ppm, from 25 ppm to 750 ppm, from 25 ppm to 500 ppm, from 25 ppm to 250 ppm, from 25 ppm to 100 ppm, from 30 ppm to 1000 ppm, e.g., from 30 ppm to 900 ppm, from 30 ppm to 750 ppm, from 30 ppm to 500 ppm, from 30 ppm to 250 ppm, or from 30 ppm to 100 ppm.

In some embodiments of the method, the cellulose acetate sample to be analyzed by the disclosed method is in the form of cellulose acetate tow. The cellulose acetate tow to be analyzed by the disclosed method may comprise cellulose acetate fibers having a denier per filament less than 12.5. The cellulose acetate tow to be analyzed by the disclosed method may comprise cellulose acetate fibers having a denier per filament greater than 12.5.

In some embodiments, the cellulose acetate sample to be analyzed by the disclosed method is a dope solution of cellulose acetate. In some embodiments, the cellulose acetate is analyzed both as a dope solution and as cellulose acetate tow.

The method of measuring titanium dioxide content of cellulose acetate comprises preparing a sample of cellulose acetate for measurement. Preparing the sample as disclosed herein can ensure precision and accuracy in determining the titanium dioxide content. Importantly, in embodiments wherein the disclosed method is used to measure the titanium dioxide of a cellulose acetate tow sample, preparing the sample as disclosed herein removes the external finish and/or any impurities that might affect the measurement. In some embodiments, the sample is prepared according to the standard test method for fiber extraction defined in ASTM D2257-98 (2012), which is incorporated herein in its entirety.

In some embodiments, preparing the sample of cellulose acetate for measurement comprises treating the cellulose acetate with an organic non-solvent. The organic non-solvent used in treating the sample is not particularly limited and may comprise, for example, alcohols, ethers, ketones, esters, and combinations thereof. The organic non-solvent may be any organic non-solvent suitable for removing the external finish and/or other impurities from the cellulose acetate. In some embodiments, the organic non-solvent may be an alcohol, such as ethanol, n-propanol, isopropyl alcohol, n-butanol, 2-butanol, isobutanol, tert-butanol, or combinations thereof. In some embodiments, the organic non-solvent may be an ether, such as diethyl ether, methyl t-butyl ether, isopropyl ether, or ethylene glycol methyl ether. In some embodiments, the organic non-solvent may be a ketone, such as 2-pentanone. In some embodiments, the organic non-solvent may be an ester, such as isopropyl acetate or isobutyl acetate. In some embodiments, the organic non-solvent is a combination of any of these solvents.

The action of treating the cellulose acetate sample with an organic non-solvent is not particularly limited and broadly includes subjecting the sample to the organic non-solvent and then drying the sample. Numerous methods of treating a sample with a non-solvent are known in the art and may be used here for treating the cellulose acetate sample with an organic non-solvent. In some embodiments, the cellulose acetate sample may simply be washed with the organic non-solvent. In other embodiments, the sample may be submerged in the organic non-solvent with or without agitation. Agitation may be manual, such as stirring by hand, or mechanical, such as in a mechanical shaker. In some embodiments, treating the cellulose acetate sample may comprise any combination these and/or other known methods of treating a sample with a non-solvent. Similarly, numerous methods of drying a sample having been treated with an organic non-solvent are known in the art and may be used here. For example, the treated sample may be squeezed, filtered, and/or drained to remove excess non-solvent and/or air dried, dried under vacuum, dried in desiccator, and/or dried in an oven.

In embodiments where the presently disclosed methods is used to measure the titanium dioxide of a cellulose acetate dope solution, there is generally no need to there is no need to remove the external finish. In these embodiments, preparing the sample broadly comprises only collecting a sample of cellulose acetate, e.g., in a test tube. Preferably, preparing the cellulose acetate dope solution removes excess solvent, so as to improve the ashing of the sample.

The method of measuring titanium dioxide content of cellulose acetate comprises ashing the sample of cellulose acetate to form an ashed sample. As noted above, samples of cellulose acetate, as described herein and for which the methods disclosed herein are suitable, have an ash weight less than that of conventional cellulose acetate, e.g., cellulose acetate comprising a higher content of titanium dioxide. The present inventors, having discovered that titanium dioxide content affects the ashing accuracy of cellulose acetate, have developed the method disclosed herein to measure titanium dioxide content.

Broadly, ashing a prepared sample of cellulose acetate according to the method disclosed herein comprises burning the sample. Numerous methods of burning cellulose acetate are known in the art and may be used here. In some embodiments, for example, ashing the prepared sample comprises lighting the sample on fire, e.g., by burning with a Bunsen burner. In another embodiment, ashing the prepared sample comprises burning the sample in a furnace, e.g., a muffle furnace, or oven. In some embodiments, ashing the prepared sample comprises multiple burning methods, e.g., both lighting the prepared sample on fire and burning the prepared sample in a furnace. The amount of time for which the prepared sample is burned is not particularly limited. In some embodiments, the sample may be burned for greater than 20 minutes, e.g., greater than 30 minutes, greater than 40 minutes, or greater than 60 minutes. Preferably the prepared sample is burned as long as necessary to completely ash the sample.

Other quantitative methods of ashing a sample of cellulose acetate are known to those of skill in the art and may also be used here.

In some embodiments, the cellulose acetate sample is subjected to further treatment after burning. This may include treating the burned sample with a salt. The burned sample is a solid, and treating the sample with salt as described herein may improve and/or ensure complete dissolution prior to subsequent quantitative analysis. This method for improving solubility of a solid sample is known in the art, and any known salt may be utilized. In some embodiments, the salt is an acid salt of an alkali metal, preferably the salt of a mineral acid. Examples of suitable acid salts include sodium pyrosulfate, sodium sulfate, sodium hydrogen sulfate, potassium pyrosulfate, potassium hydrogen pyrosulfate, potassium sulfate, and potassium hydrogen sulfate, and combinations thereof.

In some embodiments, the cellulose acetate sample is burned after treatment. Any burning method known in the art, including those discussed above, may be used to burn the cellulose acetate after treatment. In preferred embodiments, the after-treatment burning causes the solid sample to liquefy.

The method of measuring titanium dioxide content of cellulose acetate comprises dissolving the ashed sample to form a sample solution. The solvent used to dissolve the ashed sample is not particularly limited, and any solvent suitable for the analysis and uses described herein may be used. In some embodiments, the ashed sample is dissolved in water, preferably distilled water. In some embodiments, the ashed sample is dissolved in an acid, preferably a mineral acid. Examples of suitable mineral acids include hydrochloric acid, nitric acid, phosphoric acid, sulfuric acid, boric acid, and combinations thereof. In some embodiments, the ashed sample is dissolved in both water and an acid, e.g., dissolved in water and then diluted in acid or dissolved in acid and diluted in water. In some embodiments, the dissolution of the ashed sample may be used to effectively transfer the ashed sample to another vessel.

In some embodiments, the sample solution is subjected to further treatment. In some embodiments, hydrogen peroxide is added to the sample solution. The present inventors have found that hydrogen peroxide is a color reagent, which reacts with the sample solution to produce a colored solution. Thus, the addition of hydrogen peroxide allows for the colorimetric analysis of the titanium dioxide content (as described below). A person of ordinary skill in the art would appreciate that hydrogen peroxide could be replaced with an alternative color reagent, including those that are known in the art, and would understand how to alter the method described herein to employ such an alternative color reagent.

The present inventors have discovered that the titanium dioxide content of the cellulose acetate sample can be determined by comparing the sample solution to a standard solution having a known concentration of titanium dioxide. The sample solution and the standard solution can be compared by any of a number of metrics. In some embodiments, the color of the sample solution is compared to the color of the standard solution. In some of these embodiments, the color of the sample solution may be compared to the color of the standard solution by visual inspection. In some of these embodiments, the color of the sample solution may be compared to the color of the standard solution by use of a colorimeter or similar machine. The sample solution and the standard solution may be compared by other metrics, such as by spectroscopic analysis, e.g., by use of a UV-Vis spectrophotometer. In some embodiments, the color of the sample solution may be compared to the color of the standard solution by a combination of these methods In order to accurately determine the titanium dioxide content of the cellulose acetate, the method of measuring titanium dioxide content of cellulose acetate comprises titrating a blank solution with a titanium standard. The blank solution preferably comprises the same solvents as the sample solution. In some embodiments, for example, the ashed sample is dissolved in water, and the blank solution comprises water. In another embodiment, the ashed sample is dissolved in water and sulfuric acid and subsequently treated with hydrogen peroxide, and the blank solution comprises water, sulfuric acid, and hydrogen peroxide. Furthermore, the blank solution preferably comprises the same relative amounts of solvents as the sample solution.

The preparation of the titanium standard solution is not particularly limited, and any known method of preparing a solution of titanium dioxide at a known concentration may be used. According to the method disclosed herein, the titanium standard solution has a known concentration of titanium dioxide. In some embodiments, the titanium standard has a titanium dioxide concentration from 0.1 ppm to 50 ppm, e.g., from 0.1 ppm to 40 ppm, from 0.1 ppm to 30 ppm, from 0.1 ppm to 20 ppm, from 0.1 ppm to 10 ppm, from 0.25 ppm to 50 ppm, from 0.25 ppm to 40 ppm, from 0.25 ppm to 30 ppm, from 0.25 ppm to 20 ppm, from 0.25 ppm to 10 ppm, from 0.5 ppm to 50 ppm, from 0.5 ppm to 40 ppm, from 0.5 ppm to 30 ppm, from 0.5 ppm to 20 ppm, from 0.5 ppm to 10 ppm, from 0.75 ppm to 50 ppm, from 0.75 ppm to 40 ppm, from 0.75 ppm to 30 ppm, from 0.75 ppm to 20 ppm, or from 0.75 ppm to 10 ppm. In terms of upper limits, the titanium standard may have a titanium dioxide concentration of less than 50 ppm, e.g., less than 40 ppm, less than 30 ppm, less than 20 ppm, or less than 10 ppm. In terms of lower limits, the titanium standard may have a titanium dioxide concentration of greater than 0.1 ppm, e.g., greater than 0.25 ppm, greater than 0.5 ppm, or greater than 0.75 ppm.

The titration of the blank solution with the titanium standard is not particularly limited, and any known method of titrating the blank solution with a known volume of the titanium standard may be used. As noted above, the titrated blank solution is compared to the sample solution by any of various metrics, including color and spectroscopic analysis, e.g., UV-vis, blank solution is titrated with the titanium standard until a sufficient volume of the titanium standard has been added until a given metric, e.g., the color of the titrated blank solution, matches that of the sample solution.

Because the concentration of titanium dioxide in the titanium standard is known, the amount of titanium dioxide added to the blank solution at the point in which the titrated blank solution matches the sample solution can be calculated. From this, the concentration of titanium dioxide in the sample solution, and therefore in the cellulose acetate sample, can be calculated. In embodiments where the cellulose acetate sample is a dope solution of cellulose acetate, the concentration of cellulose acetate in the dope solution is generally required to calculate the concentration of titanium dioxide.

Measuring Color of Cellulose Acetate Tow

As noted above, previous efforts to produce cellulose acetate tow with a reduced titanium dioxide content, e.g., cellulose acetate tow that is substantially free of titanium dioxide, have been limited due to the inadequacy of conventional methods for analytical measurement and/or quality control. In particular, the present inventors have found that it had been difficult to produce cellulose acetate tow with a low titanium dioxide content of satisfactory quality, because certain conventional analytical methods could not be utilized for such tow. One example of an analytical method that limited the development of the cellulose acetate tow described herein is a method for measuring the color of the cellulose acetate tow.

The color, e.g., the whiteness, of cellulose acetate tow is an important feature in its commercial usefulness and/or desirability. The importance of the color of cellulose acetate tow is typically considered during the production of the tow. For example, production may be designed to produce cellulose acetate tow a certain color. Similarly, production may be designed to produce cellulose acetate tow of a consistent color. In order to ensure that these metrics are satisfied, conventional cellulose acetate tow production typically includes measuring the color of the dope solution, which is a good indicator of the tow color. The color of the dope solution is typically measured as "L," "a," and "b" color parameters using suitable instrumentation, e.g., a colorimeter. The "L" color parameter refers to lightness, and typically ranges from 0 (the darkest black) to 100 (the brightest white). The "a" and "b" color parameters define axes of color. The "a" color parameter represents the green-red component, with green in the negative and red in the positive. The "b" color parameter represents the blue-yellow, with blue in the negative and yellow in the positive. The "L" color parameter may be particularly important in measuring the whiteness of a cellulose acetate tow product.

As noted above, the pigment titanium dioxide is added to conventional cellulose acetate tow bands. The conventional addition of titanium dioxide can ensure consistency of color in the dope solution and, ultimately, in the cellulose acetate tow. In addition, the conventionally added titanium dioxide acts as a delusterant, reducing the brightness of the product tow band.

The present inventors have found that conventional methods of measuring the color of a dope solution are not effective for measuring the color of a dope solution having a low titanium dioxide content. Without the addition of titanium dioxide, the light reflectance properties of the dope solution are altered. Because conventional methods of measuring the color of the dope solution include measurements of light, the change in light reflectance affects the color measurement. Thus, the removal of titanium dioxide renders conventional spectroscopic techniques, e.g., color measurement, ineffective.

As noted above, the present disclosure relates to a novel and inventive method for measuring the color of a cellulose acetate that is suitable for a cellulose acetate having low concentrations of titanium dioxide. In particular, the method is suitable for measuring the color of a cellulose acetate dope solution. In some embodiments, the method may be used to measure the color of a dope solution prior to spinning the cellulose acetate fiber.

In some embodiments, the method may be used to measure the color of a dope solution formed by dissolving a sample of cellulose acetate fiber or tow in a suitable solvent. The cellulose acetate tow to be analyzed by the disclosed method may comprise cellulose acetate fibers having a denier per filament less than 12.5. The cellulose acetate tow to be analyzed by the disclosed method may comprise cellulose acetate fibers having a denier per filament greater than 12.5.

This novel method comprises preparing a patty of cellulose acetate from the dope solution; providing a tile; placing the patty and the tile on a reflectance port of a colorimeter such that the tile is behind the patty; and recording the color of the patty using the colorimeter.

The method for measuring the titanium dioxide content of cellulose acetate dope solution disclosed herein is suitable for cellulose acetate samples having relatively low titanium dioxide contents. In some embodiments, the method is suitable for cellulose acetate samples having a titanium dioxide of less than 0.1 wt. % (1000 ppm), e.g., less than 900 ppm, less than 750 ppm, less than 500 ppm, less than 250 ppm, or less than 100 ppm. In terms of lower limits, the method may be suitable for cellulose acetate samples having a titanium dioxide content of greater than 0 ppm, e.g., greater than 10 ppm, greater than 15 ppm, or greater than 25 ppm. In terms of rangers, the method may be suitable for cellulose acetate samples having a titanium dioxide content of from 0 ppm to 1000 ppm, e.g., from 0 ppm to 900 ppm, from 0 ppm to 750 ppm, from 0 ppm to 500 ppm, from 0 ppm to 250 ppm, from 0 ppm to 100 ppm, from 10 ppm to 1000 ppm, from 10 ppm to 900 ppm, from 10 ppm to 750 ppm, from 10 ppm to 500 ppm, from 10 ppm to 250 ppm, from 10 ppm to 100 ppm, from 15 ppm to 1000 ppm, e.g., from 15 ppm to 900 ppm, from 15 ppm to 750 ppm, from 15 ppm to 500 ppm, from 15 ppm to 250 ppm, from 15 ppm to 100 ppm, from 25 ppm to 1000 ppm, e.g., from 25 ppm to 900 ppm, from 25 ppm to 750 ppm, from 25 ppm to 500 ppm, from 25 ppm to 250 ppm, or from 25 ppm to 100 ppm.

The method for measuring the color of cellulose acetate dope solution comprises preparing a patty of cellulose acetate from the dope solution. The method of forming the patty is not particularly limited, and any known method of forming the cellulose acetate of the dope solution into a patty suitable for measurement according the present method may be used. In some embodiments, the patty of cellulose acetate is prepared manually, e.g., pressing by hand. In some embodiments, the patty of cellulose acetate is prepared mechanically, e.g., pressing by a press plate or similar machine.

In some embodiments, the cellulose acetate of the dope solution may be heated prior to, during, or after pressing. Heating the dope solution in these embodiments more readily evaporates the solvent of the dope solution, which provides for the formation of the patty of cellulose acetate. In some embodiments, the patty of cellulose acetate is formed by pressing the dope solution on a hot plate. In some embodiments, the dope solution is pressed on a hot plate using a press plate. In embodiments that include a hot plate, the hot plate may be at a temperature from 100° C. to 200° C., e.g., from 100° C. to 190° C., from 100° C. to 180° C., from 100° C. to 170° C., from 100° C. to 160° C., from 110° C. to 200° C., from 110° C. to 190° C., from 110° C. to 180° C., from 110° C. to 170° C., from 110° C. to 160° C., from 120° C. to 200° C., from 120° C. to 190° C., from 120° C. to 180° C., from 120° C. to 170° C., from 120° C. to 160° C., from 130° C. to 200° C., from 130° C. to 190° C., from 130° C. to 180° C., from 130° C. to 170° C., from 130° C. to 160° C., from 140° C. to 200° C., e.g., from 140° C. to 190° C., from 140° C. to 180° C., from 140° C. to 170° C., or from 140° C. to 160° C. In terms of lower limits, the hot plate temperature may be greater than 100° C., e.g., greater than 110° C., greater than 120° C., greater than 130° C., or greater than 140° C. In terms of upper limits, the hot plate temperature may be less than 200° C., e.g., less than 190° C., less than 180° C., less than 170° C., or less than 160° C. In these embodiments, the cellulose acetate tow is preferably allowed to cool.

The method for measuring the color of cellulose acetate dope solution comprises providing a tile and placing the patty and the tile on a reflectance port of a colorimeter such that the tile is behind the patty. As noted above, the lack of titanium dioxide in the cellulose acetate dope solution affects the light reflectance properties of the cellulose acetate. The present inventors have discovered that placing a tile behind the patty allows for accurate measurement of the color of the cellulose acetate that has a low titanium dioxide content.

Placing the tile behind the patty of cellulose acetate improves the reflection of light and thus allows for spectroscopic analysis. The tile used in the method disclosed herein is not particularly limited as long as the tile suitable improves the reflection. In preferred embodiments, the tile is substantially white, so is to ensure proper reflection of light. One example of a commercially available tile suitable for use in the present method is the BRCA-WT-02C Ceramic Gray Scale Tile by Avian Technologies Ltd.

The method for measuring the color of cellulose acetate comprises recording the color of the patty using the colorimeter. The instrumentation of the colorimeter to be used in the method disclosed herein is not particularly limited. One example of a commercially available colorimeter suitable for use in the present method is the HunterLab UltraScan VIS Spectrophotometer. The colorimeter is preferably standardized and/or calibrated prior to use.

After completing a scan of the cellulose acetate patty, the colorimeter preferably reports the color of the patty. The color is typically reported in "L," "a," and "b" values.

In one embodiment, the cellulose acetate patty has an "L" value from 90 to 100, e.g., from 90 to 99.99, from 90 to 99.9, from 90 to 99.5, from 90 to 99, from 91 to 100, from 91 to 99.99, from 91 to 99.9, from 91 to 99.5, from 91 to 99, from 92 to 100, from 92 to 99.99, from 92 to 99.9, from 92 to 99.5, from 92 to 99, from 93 to 100, from 93 to 99.99, from 93 to 99.9, from 93 to 99.5, from 93 to 99, from 94 to 100, from 94 to 99.99, from 94 to 99.9, from 94 to 99.5, or from 94 to 99. In terms of lower limits, the "L" value of the cellulose acetate patty may be greater than 90, e.g., greater than 91, greater than 92, greater than 93, or greater than 94. In terms of upper limits, the "L" value of the cellulose acetate patty may be less than 100, e.g., less than 99.99, less than 99.9, less than 99.5, or less than 99.

In one embodiment, the cellulose acetate patty has an "a" value from −1 to 0.5, e.g., from −1 to 0.45, from −1 to 0.4, from −1 to 0.35, from −1 to 0.25, from −0.95 to 0.5, from −0.95 to 0.45, from −0.95 to 0.4, from −0.95 to 0.35, from −0.95 to 0.25, from −0.9 to 0.5, from −0.9 to 0.45, from −0.9 to 0.4, from −0.9 to 0.35, from −0.9 to 0.25, from −0.85 to 0.5, from −0.85 to 0.45, from −0.85 to 0.4, from −0.85 to 0.35, from −0.85 to 0.25, from −0.8 to 0.5, from −0.8 to 0.45, from −0.8 to 0.4, from −0.8 to 0.35, or from −0.8 to −0.7. In terms of lower limits, the "a" value of the cellulose acetate patty may be greater than −1, e.g., greater than −0.95, greater than −0.9, greater than −0.85, or greater than −0.8. In terms of upper limits, the "a" value of the cellulose acetate patty may be less than 0.5, e.g., less than 0.45, less than 0.4, less than 0.35, or less than −0.7.

In one embodiment, the cellulose acetate patty has a "b" value from 3 to 6, e.g., from 3 to 5.75, from 3 to 5.5, from 3 to 5.25, from 3 to 5, from 3 to 4.75, from 3.25 to 6, from 3.25 to 5.75, from 3.25 to 5.5, from 3.25 to 5.25, from 3.25 to 5, from 3.25 to 4.75, from 3.5 to 6, from 3.5 to 5.75, from 3.5 to 5.5, from 3.5 to 5.25, from 3.5 to 5, from 3.5 to 4.75, from 3.75 to 6, from 3.75 to 5.75, from 3.75 to 5.5, from 3.75 to 5.25, from 3.75 to 5, from 3.75 to 4.75, from 4 to 6, from 4 to 5.75, from 4 to 5.5, from 4 to 5.25, from 4 to 5, from 4 to 4.75, from 4.25 to 6, from 4.25 to 5.75, from 4.25 to 5.5, from 4.25 to 5.25, from 4.25 to 5, or from 4.25 to 4.75. In terms of lower limits, the "b" value of the cellulose patty may be greater than 3, e.g., greater than 3.25, greater than 3.5, greater than 3.75, greater than 4, or greater than 4.25. In terms of upper limits, the "b" value of cellulose acetate patty may be less than 6, e.g., less than 5.75, less than 5.5, less than 5.25, less than 5, or less than 4.75.

While the invention has been described in detail, modifications within the spirit and scope of the invention will be readily apparent to those of skill in the art. It should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only, and is not intended to limit the invention. All US patents and publications cited herein are incorporated by reference in their entirety.

EXAMPLES

Example 1

The disclosed method of measuring titanium dioxide was used to measure the titanium dioxide of several samples of cellulose acetate tow.

Each tow sample was prepared by treating with isopropyl alcohol. In particular, each tow sample was shaken with isopropyl alcohol in a wrist-action shaker. The tow sample was then squeezed to remove excess isopropyl alcohol, placed in a fume hood to dry, and subsequently placed in an oven to dry.

Each tow sample was then ashed by burning with a Bunsen burner until the sample burned itself out and then by placing in a muffle furnace for one hour or until the sample was completely ashed and no glowing particles remained.

After ashing, each tow sample was allowed to cool. The sample was then treated with potassium hydrogen sulfate and burned again until all solid material liquefied. The liquefied ashed sample was then dissolved in sulfuric acid and treated with hydrogen peroxide.

The titanium dioxide content of each tow sample was determined by titrating a blank solution with a titanium standard. The blank solution comprised water, sulfuric acid, and hydrogen peroxide. The titanium standard comprised 0.1 ppm of titanium dioxide. The titanium standard was added to the blank solution until the color of the blank solution matched the color of each sample. The volume of the titanium standard added to the blank solution was used to calculate with titanium dioxide content of the tow sample. Results for several samples are reported in Table 1, below:

TABLE 1

| Sample | 1 | 2 | 3 |
|---|---|---|---|
| Sample Mass (g) | 12.423 | 14.943 | 12.209 |
| Titration Volume (mL) | 17.5 | 29.0 | 25.0 |
| TiO$_2$ Content (ppm) | 14 | 19 | 20 |

Example 2

The disclosed method of measuring titanium dioxide was used to measure the titanium dioxide of several samples of a dope solution of cellulose acetate. Each dope sample comprised a solution of cellulose acetate with a mixture of water and acetone as solvents. Each sample had a dope solids concentration from 20 wt. % to 35 wt. %.

Each dope sample was ashed by burning with a Bunsen burner until the sample burned itself out and then by placing in a muffle furnace for one hour or until the sample was completely ashed and no glowing particles remained.

After ashing, each dope sample was allowed to cool. The sample was then treated with potassium hydrogen sulfate and burned again until all solid material liquefied. The liquefied ashed sample was then dissolved in sulfuric acid and treated with hydrogen peroxide.

The titanium dioxide content of each dope sample was determined by titrating a blank solution with a titanium standard. The blank solution comprised water, sulfuric acid, and hydrogen peroxide. The titanium standard comprised 0.1 ppm of titanium dioxide. The titanium standard was added to the blank solution until the color of the blank solution matched the color of each sample. The volume of the titanium standard added to the blank solution was used to calculate with titanium dioxide content of the dope sample. Results for several samples are reported in Table 2, below:

TABLE 2

| Sample | 1 | 2 | 3 | 4 |
|---|---|---|---|---|
| Sample Mass (g) | 11.640 | 10.499 | 11.957 | 10.821 |
| Titration Volume (mL) | 17.5 | 14.0 | 17.5 | 14.0 |
| TiO$_2$ Content (ppm) | <65 | <55 | <60 | <55 |

Example 3

The disclosed method of measuring titanium dioxide was used to measure the color of several samples of cellulose acetate dope solution. Each dope sample comprised a solution of cellulose acetate with a mixture of water and acetone as solvents.

A patty of cellulose acetate was prepared from each dope sample. In particular, each patty was prepared by pressing about 4 to 5 grams of each dope sample on a hot plate using a press plate. The hot plate was set to approximately 150° C. Each sample was left covered on the hot plate for about 5 minutes, after which time the patty was removed and allowed to cool.

The color of each patty was measuring using a colorimeter, particularly a HunterLab UltraScan VIS Spectrophotometer. Each patty was placed on the reflectance port of the colorimeter with a white tile behind the patty. The colorimeter then recorded the color of each patty and reported the color in "L," "a," and "b" values. Results for several samples are reported in Table 3, below:

TABLE 3

| Sample | "L" Value | "a" Value | "b" Value |
|---|---|---|---|
| 1 | 94.60 | −0.87 | 5.34 |
| 2 | 94.63 | −0.75 | 4.31 |
| 3 | 94.78 | −0.82 | 4.61 |
| 4 | 94.57 | −0.75 | 4.41 |
| 5 | 94.61 | −0.75 | 4.42 |
| 6 | 94.71 | −0.72 | 4.34 |
| 7 | 94.65 | −0.73 | 4.23 |

We claim:

1. A tow band comprising
cellulose acetate fibers having a denier per filament less than 12.5;
wherein the tow band comprises less than 0.1 wt. % titanium dioxide as measured by ashing and titrating and/or by titanium particle count density;
and wherein the tow band has an "L" value from 90 to 100, an "a" value from −1 to 0.5, and a "b" value from 3 to 6 as measured from a dope solution.

2. The tow band of claim 1, comprising from 10 to 90 ppm titanium dioxide.

3. The tow band of claim 1, wherein the tow band has an ash weight that is less than 0.1 % of the tow band.

4. The tow band of claim 1, wherein the tow band has less than 1.0 titanium dioxide particles per denier.

5. The tow band of claim 1, wherein the tow band has from 5,000 to 100,000 total denier.

6. The tow band of claim 1, wherein the cellulose acetate fibers have a cross-sectional shape selected from the group consisting of circular, substantially circular, crenulated, ovular, substantially ovular, polygonal, substantially polygonal, dog-bone, "Y," "X," "K," "C," multi-lobe, and any combination thereof.

7. A method of measuring a titanium dioxide content of cellulose acetate from the tow band of claim 1, the method comprising:
preparing a sample of the cellulose acetate from the tow band of claim 1 for measurement;
ashing the sample to form an ashed sample;
dissolving the ashed sample to form a sample solution;
titrating a blank solution with a titanium standard to form a titrated blank solution; and
comparing the titrated blank solution with the sample solution.

8. The method of claim 7, wherein the preparing comprises treating the cellulose acetate with an organic non-solvent selected from the group consisting of isopropyl alcohol, diethyl ether, 2-butanol, methyl-t-butyl ether, ispropyl ether, 2-pentanone, isobutyl acetate, ethylene glycol methyl ether, alcohols, ethers, ketones, esters, and combinations thereof.

9. The method of claim 7, wherein the ashing further comprises:
burning the sample; and
treating with a salt selected from the group consisting of sodium pyrosulfate, sodium sulfate, sodium hydrogen sulfate, potassium pyrosulfate, potassium hydrogen pyrosulfate, potassium sulfate, potassium hydrogen sulfate, and combinations thereof.

10. The method of claim 7, wherein the dissolving comprises dissolving the ashed sample in water and/or an acid.

11. The method of claim 7, further comprising treating the sample solution with hydrogen peroxide.

12. The method of claims 7, wherein the blank solution comprises water, sulfuric acid, and hydrogen peroxide.

13. The method of claim 7, wherein the titanium standard comprises from 0.1 to 50 ppm titanium dioxide.

14. A method for measuring the color of a dope solution of cellulose acetate from the tow band of claim 1, the method comprising:
preparing a patty of the cellulose acetate from from the tow band of claim 1 the dope solution;
providing a tile;
placing the patty and the tile on a reflectance port of a colorimeter such that the tile is behind the patty; and
recording the color of the patty using the colorimeter.

15. The method of claim 14, wherein the preparing comprises pressing the cellulose acetate on a hot plate.

16. The method of claim 14, wherein the tile is white.

17. A tow band comprising:
cellulose acetate fibers having a denier per filament of less than 12.5;
wherein the tow band comprises from 10 ppm to less than 100 ppm wt. % titanium dioxide, and
wherein the tow band has an average titanium dioxide particle density of less than 1.0 titanium dioxide particles per fiber denier; andwherein the tow band has an "L" value from 90 to 100, an "a" value from −1 to 0.5, and a "b" value from 3 to 6 as measured from a dope solution.

18. The tow band of claim 17, wherein the tow band comprises greater than 20,000 total denier.

* * * * *